June 12, 1951     H. L. ROSS     2,556,779
ILLUMINATED DISPLAY
Filed Dec. 27, 1948     2 Sheets-Sheet 1
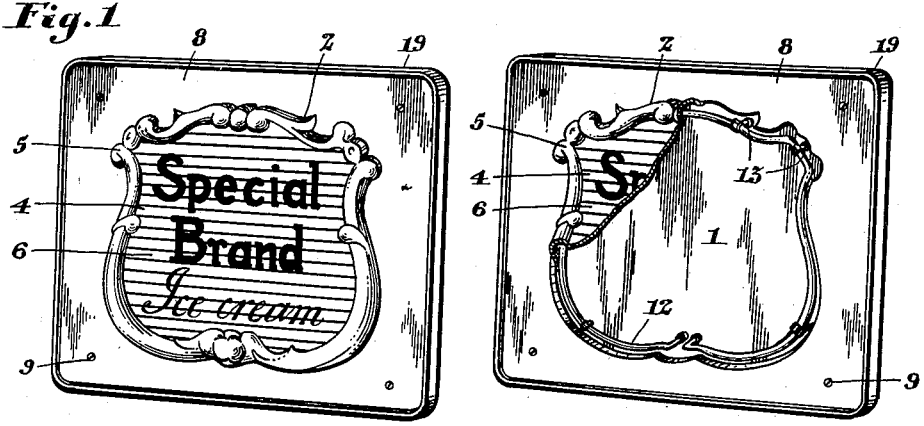
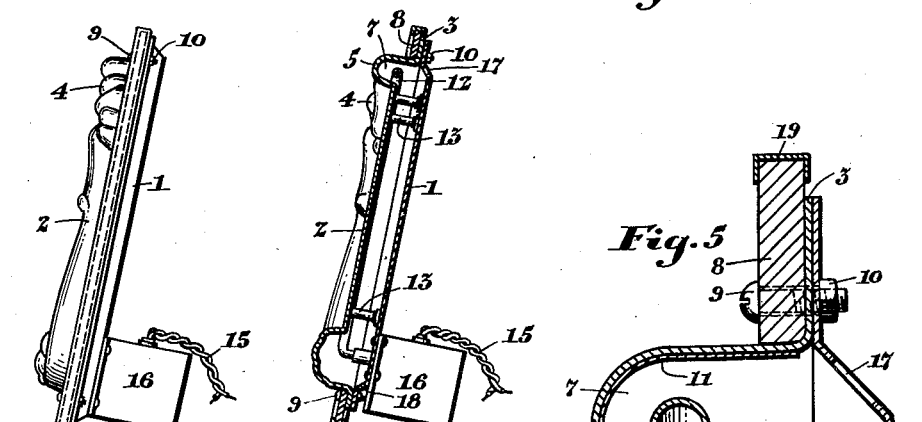
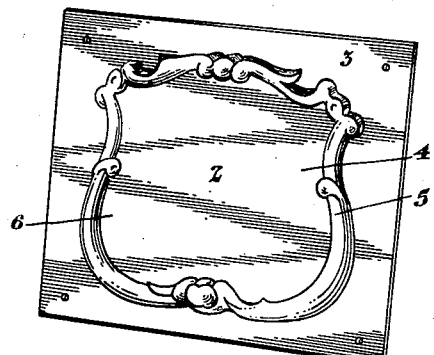
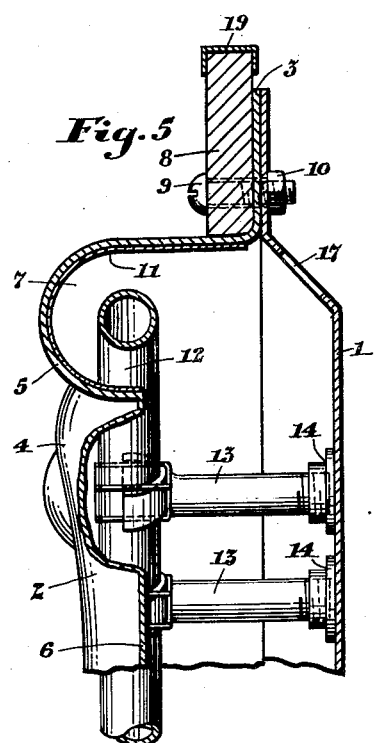
INVENTOR.
Harry Lou Ross
BY John S. Braddock
Attorney June 12, 1951  H. L. ROSS  2,556,779
ILLUMINATED DISPLAY
Filed Dec. 27, 1948  2 Sheets-Sheet 2

INVENTOR.
Harry Lon Ross
BY John S. Braddock
Attorney

Patented June 12, 1951

2,556,779

UNITED STATES PATENT OFFICE 2,556,779

ILLUMINATED DISPLAY

Harry Lon Ross, New York, N. Y., assignor to Kay, Inc., New York, N. Y., a corporation Application December 27, 1948, Serial No. 67,507

6 Claims. (Cl. 40—132)

The present invention relates to illuminated display devices, and the primary objects of the invention are to provide an illuminated display device in which the source of light is concealed; to provide such a display device in which the source of light is comprised of neon tubing so disposed with relation to the other parts of the device that the tubing itself is concealed from view while the light emanating therefrom is utilized to illuminate the display; to provide such a display device in which the light from the neon is effectively diffused over the entire area of the display proper; to provide such a display device in which the display proper is effectively silhouetted against an evenly lighted background, thus giving the illusion that the display is floating in space with no apparent support; and in general to provide such an illuminated display device which is simple in construction and therefore reasonably economical in manufacture, and at the same time highly effective and attractive in appearance.

An illustrative embodiment of the invention is shown in the accompanying drawing, wherein:

Figure 1 is a front perspective view of the display device;

Figure 2 is a view similar to Figure 1 but with a certain portion of the device broken away to reveal the parts beyond;

Figure 3 is a side elevational view of the device;

Figure 4 is a view of the device shown partly in side elevation and partly in central vertical section;

Figure 5 is an enlarged, fragmentary, central vertical sectional view of the top portion of the device;

Figure 6 is a front perspective view of a blank tablet which comprises one element of the display device.

Figure 7:
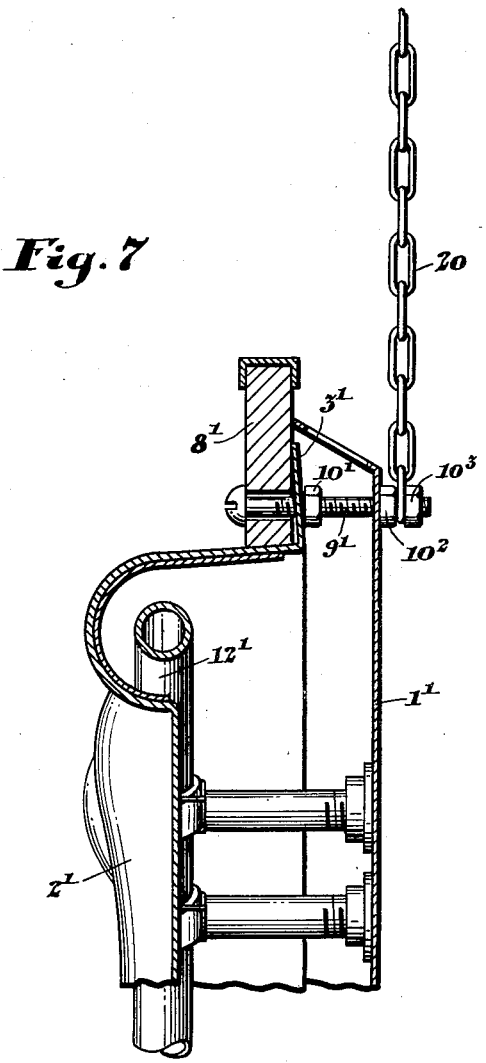
Figure 7 is a fragmentary, central vertical sectional view similar to Figure 5 but showing a modified form of structure.

Referring now in detail to this drawing, the display device there shown comprises a rear panel 1 having its middle portion slightly depressed and having its front surface coated with a light colored, light-reflecting material. A tablet 2, shown per se in Figure 6, is desirably formed of a transparent plastic either molded to the desired form or formed between dies from a flat sheet. The tablet has a flat border 3 adapted to lie flat adjacent the marginal front surface of the rear panel 1 and has an embossment 4 here shown in the form of a cartouche, but which embossment may be of any desired form such as ovate, square, diamond-shaped, etc. The marginal area 5 of the embossment 4 is raised to a greater degree than the middle area 6 thereof so as to form a marginal pocket 7 in the embossment. A front panel 8, desirably opaque and decorative as to color, is disposed adjacent the front surface of the border 3 of the tablet, said panel having an opening therethrough which conforms to the peripheral contour of the embossment 4 of the tablet and through which opening said embossment projects. Fastening means such as the bolts 9 passing through aligned apertures in the front panel 8, the border 3 of the tablet, and the rear panel 1, and provided with nuts 10, secure these parts in assembly.

The marginal area 5 of the embossment 4 of the tablet 2 is coated with a non-transparent coating material 11 (see Figure 5) here shown applied to the inside surface of said marginal area. The middle area 6 of the embossment 4 is left transparent except for the display applied thereto, which as here shown comprises flat lettering and a series of horizontal lines, but which may be given any other suitable form. The light source for the display is comprised of neon tubing 12 wired to and supported by glass posts 13 threaded into cups 14 affixed as by welding to the front surface of the rear panel 1. The neon tubing 12 is disposed within and extends around the marginal pocket 7 of the embossment 4 on the tablet 2, and the tubing is concealed from the observer's view by the translucent coating 11 on said embossment's marginal area. The neon tubing is energized by a suitable source of electricity indicated by wires 15, which passes through a transformer 16 secured as by rivets to the rear panel 1, and as shown in Figures 3 and 4 said transformer also serves as a support for maintaining the display device in an erect position.

Vents 17 and 18 are provided at the top and bottom of the rear panel 1 for providing circulation of air through the illuminated display. If desired a decorative molding 19 of polished aluminum may be applied around the outer periphery of the front panel 8.

It will be seen that although the source of illumination, i. e. the neon tubing 12 is concealed from the observer's view, it distributes diffused illumination over the entire front surface of the light-reflecting rear panel 1 because of its disposition completely around the margin of the embossment 4, and the display on the middle area of the embossment is effectively silhouetted against the rear panel as a background, thus giving the illusion that the display is freely floating in space. The attractiveness of the display may be further enhanced by coating the marginal area 5 of the embossment 4 with a translucent rather than an opaque material, thus providing a softly lighted frame for the display, although it will be understood that in some instances it may be found desirable to apply an opaque coating to the marginal area 5. In either instance the marginal area 5 is non-transparent for effectively concealing the neon tubing.

Figure 7 illustrates a modified form of the invention, wherein the front panel $8^1$ and the border $3^1$ of the tablet $2^1$ are secured together by means of relatively long bolts $9^1$ having nuts $10^1$ threaded thereon for securing these parts in assembly. The bolts $9^1$ extend through apertures in the rear wall of the rear panel $1^1$, and are provided with additional nuts $10^2$ threaded thereon for detachably securing the rear panel $1^1$ to the assembled front panel $8^1$ and tablet $2^1$. It will be seen that by this arrangement the rear panel $1^1$ with the neon tubing $12^1$ mounted thereon may be removed for repair or for replacement of the neon tubing without disturbing the remainder of the assembly. If desired, additional nuts $10^3$ may be provided on the extreme rearward ends of the bolts $9^1$ for securing thereto hang chains 20 by means of which the display device may be suspended from a ceiling or other suitable overhead support.

The invention being intended to be pointed out in the claims, it is not to be limited to or by details of construction of the particular embodiment thereof hereinbefore described and illustrated in the drawings.

I claim:

1. In an illuminated display device: a light-reflecting panel; a tablet mounted on the panel and having an embossment spaced forwardly from the panel, said embossment having a non-transparent marginal area and a transparent middle area bearing thereon a display; and a source of light disposed between the light reflecting panel and the non-transparent marginal area of said embossment.

2. In an illuminated display device: a light-reflecting panel; a tablet mounted on the panel and having an embossment spaced forwardly from the panel, said embossment having a translucent marginal area and a transparent middle area bearing thereon a display; and a source of light disposed between the light-reflecting panel and the translucent marginal area of said embossment.

3. In an illuminated display device: a light-reflecting panel; a tablet mounted on the panel and having an embossment spaced forwardly from the panel, said embossment being raised to a greater degree in its marginal area than in its middle area to thus form a marginal pocket, said marginal area being non-transparent and said middle area being transparent and provided with a display thereon; and a source of light disposed within the marginal pocket in said embossment.

4. In an illuminated display device; a light-reflecting panel; a tablet mounted on the panel and having an embossment spaced forwardly from the panel, said embossment being raised to a greater degree in its marginal area than in its middle area to thus form a marginal pocket, said marginal area being non-transparent and said middle area being transparent and provided with a display thereon; and a tubular source of light disposed within and extending around the marginal pocket in said embossment.

5. In an illuminated display device: a light reflecting panel, a tablet having a flat border disposed adjacent the front marginal surface of said light-reflecting panel and having an embossment spaced forwardly from the panel, said embossment having a non-transparent marginal area and a transparent middle area bearing thereon a display; a front panel disposed adjacent the front surface of the border of said tablet and having an opening therethrough through which extends the embossment of the tablet; fastening means for securing together the front panel, the border of the tablet and the light-reflecting panel, and a source of light disposed between the light-reflecting panel and the non-transparent marginal area of said embossment.

6. In an illuminated display device: a light-reflecting panel; a tablet formed of a transparent material and having an embossment spaced forwardly from the panel, a coating of non-transparent material applied to the marginal area of said embossment; a display applied to the middle area of said embossment; and a source of light disposed between the light-reflecting panel and the non-transparent marginal area of said embossment.

HARRY LON ROSS.

REFERENCES CITED

The following references are of record in the file of this patent:

UNITED STATES PATENTS

| Number | Name | Date |
|---|---|---|
| 1,772,410 | Abel | Aug. 5, 1930 |
| 2,027,187 | Luna | Jan. 7, 1936 |
| 2,093,412 | Bradshaw et al. | Sept. 21, 1937 |
| 2,237,750 | Wamser | Apr. 8, 1941 |
| 2,499,063 | Hammer | Feb. 28, 1950 |